(12) United States Patent
Katsuki et al.

(10) Patent No.: US 8,553,267 B2
(45) Date of Patent: Oct. 8, 2013

(54) IMAGE FORMING SYSTEM

(75) Inventors: Takuya Katsuki, Osaka (JP); Takashi Nakagawa, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 299 days.

(21) Appl. No.: 13/065,925

(22) Filed: Apr. 1, 2011

(65) Prior Publication Data

US 2011/0242596 A1    Oct. 6, 2011

(30) Foreign Application Priority Data

Apr. 2, 2010    (JP) ................................. 2010-086385

(51) Int. Cl.
*G06F 15/00*    (2006.01)

(52) U.S. Cl.
USPC ....................................................... 358/1.15

(58) Field of Classification Search
USPC ....................................................... 358/1.15
See application file for complete search history.

(56) References Cited

U.S. PATENT DOCUMENTS

2009/0138878 A1*   5/2009   Fernstrom et al. ............ 718/102

FOREIGN PATENT DOCUMENTS

| JP | 10-024642 A | 1/1998 |
|---|---|---|
| JP | 2007-148613 A | 6/2007 |
| JP | 2008-209974 A | 9/2008 |

* cited by examiner

*Primary Examiner* — Saeid Ebrahimi Dehkordy
(74) *Attorney, Agent, or Firm* — Edwards Wildman Palmer LLP; David G. Conlin; David A. Tucker

(57) ABSTRACT

If the user of an information processor enters into it a performance request to perform a job and a notification request to notify one or more other information processors of batch processing for the job, this processor transmits the performance and notification requests to a management apparatus. When the management apparatus receives the requests, the apparatus transmits to that processor or those processors a batch m processing notification inviting it or them to transmit to the apparatus a performance request to perform a job. If, within a specified length of time after the notification transmission, the management apparatus receives from that processor or at least one of those processors a performance request to perform a job, the apparatus transmits to an image forming apparatus the jobs which the image forming apparatus is requested to perform. Then, the image forming apparatus performs the jobs by means of batch processing.

5 Claims, 14 Drawing Sheets

FIG.3A

| JOB PERFORMANCE REQUESTER | JOB FILE NAME | PRINTING DATE | KEYWORD/S | BATCH PROCESSING NOTIFICATION DESTINATION/S |
|---|---|---|---|---|
| PC3A | materials for meeting A.doc | 12/18/2009 | meeting A advance arrangement materials | Taro Yamada (PC 3B)<br>Jiro Yamamoto (PC 3C)<br>------- |
| PC3B | weekly report 091218.txt | 12/18/2009 | weekly report | Jiro Yamamoto (PC 3C)<br>Hanako Tanaka (PC 3D)<br>------- |

FIG.3B

| JOB PERFORMANCE REQUESTER | JOB FILE NAME | PRINTING DATE | KEYWORD/S | BATCH PROCESSING NOTIFICATION DESTINATION/S |
|---|---|---|---|---|
| PC3A | minutes of meeting A.doc | 1/1/2010 | meeting A minutes | Taro Yamada (PC 3B) |
| PC3A | materials for meeting A.doc | 12/18/2009 | meeting A advance arrangement materials | Taro Yamada (PC 3B)<br>Jiro Yamamoto (PC 3C)<br>------- |
| PC3B | weekly report 091218.txt | 12/18/2009 | weekly report | Jiro Yamamoto (PC 3C)<br>Hanako Tanaka (PC 3D)<br>------- |

FIG.4A

| JOB FILE NAME | PRINTING DATE | KEYWORD/S | BATCH PROCESSING NOTIFICATION DESTINATION/S |
|---|---|---|---|
| materials for meeting A.doc | 12/18/2009 | meeting A advance arrangement materials | Taro Yamada (PC 3B)<br>Jiro Yamamoto (PC 3C)<br>------- |
| weekly report 091217.txt | 12/17/2009 | weekly report | Taro Yamada (PC 3B)<br>Hanako Tanaka (PC 3D)<br>------- |

FIG.4B

| JOB FILE NAME | PRINTING DATE | KEYWORD/S | BATCH PROCESSING NOTIFICATION DESTINATION/S |
|---|---|---|---|
| minutes of meeting A.doc | 1/1/2010 | meeting Aminutes | Taro Yamada (PC 3B)<br>Hanako Tanaka (PC 3D) |
| materials for meeting A.doc | 12/18/2009 | meeting A advance arrangement materials | Taro Yamada (PC 3B)<br>Jiro Yamamoto (PC 3C)<br>------- |
| weekly report 091217.txt | 12/17/2009 | weekly report | Taro Yamada (PC 3B)<br>Hanako Tanaka (PC 3D)<br>------- |

IMAGE FORMING SYSTEM

CROSS REFERENCE

This Nonprovisional application claims priority under 35 U.S.C. §119(a) on Patent Application No. 2010-086385 filed in Japan on Apr. 2, 2010, the entire contents of which are hereby incorporated by reference.

BACKGROUND OF THE INVENTION

The present invention relates to an image forming system including information processors and an image forming apparatus which receives from each of them a request to perform a job.

If a conventional image forming apparatus waits for a job for a time longer than a specified value, the apparatus cuts off the power supply to its functional sections, changing over to the sleep mode to reduce power consumption. If the image forming apparatus receives from an information processor a request to perform a job, the apparatus starts the power supply to the functional sections, changing over from the sleep mode to the operation mode to perform the job. However, because the image forming apparatus consumes a large amount of power when it changes over from the sleep mode to the operation mode, the apparatus cannot reduce power consumption if it frequently changes over to the operation mode.

JP-H10-24642-A discloses an image forming apparatus which receives from an information processor a request to perform a job and the time reserved for the job. The image forming apparatus performs the job at the reserved time. The image forming apparatus stores the times reserved for jobs. The image forming apparatus so accepts a request to perform a job and the time reserved for this job that there is no free time between the reserved times. This enables the image forming apparatus to reduce the number of times it changes over from the sleep mode to the operation mode. The reduction of the number of times m reduces power consumption.

JP-2008-209974-A discloses a printing reservation system including a management apparatus and an information processor which transmits to the apparatus a request to perform a job and the time reserved for the job. The management apparatus stores the request and the reserved time, with the time so changed that there is no free time between the times reserved for jobs. At the time reserved for a job, the management apparatus transmits to an image forming apparatus a request to perform the job. Receiving the request, the image forming apparatus performs the job. This enables the image forming apparatus to reduce the number of times it changes over from the sleep mode to the operation mode. The reduction of the number of times reduces power consumption.

The invention disclosed in each of the two documents is such that, if the image forming apparatus receives a request to perform a job when it receives the request, it performs the job immediately. If the image forming apparatus is in the sleep mode when it receives the request, it changes over to the operation mode and performs only this job. This increases the number of times the image forming apparatus changes over from the sleep mode to the operation mode. The increase in the number of times increases power consumption.

The object of the present invention is to provide an image forming system in which, if the management apparatus receives w from one of the information processors a request to perform a job, the apparatus invites one or more of the other processors to transmit to it a request to perform a job, and in which the image forming apparatus performs the jobs by means of batch processing so that power consumption can be reduced.

SUMMARY OF THE INVENTION

An image forming system includes information processors, a management apparatus, and an image forming apparatus. The information processors are connected to the management apparatus, which is connected to the image forming apparatus. Each of the information processors includes a displaying means. The management apparatus includes a receiving means and a batch processing notifying means. The receiving means receives from any one of the information processors a performance request to perform a job. The image forming apparatus receives the job from the management apparatus and performs the received job.

When the receiving means of the management apparatus receives the performance request, the batch processing notifying means of this apparatus transmits to one or more of the other information processors a batch processing notification inviting it or them to transmit to the apparatus a performance request to perform a job. When that processor or those processors receive the batch processing notification, the associated displaying means display information that the processor or processors are invited to transmit to the management apparatus a performance request to perform a job.

Thus, if the management apparatus receives from one of the information processors a request to perform a job, this apparatus transmits to one or more of the other processors a batch processing notification inviting it or them to transmit to the apparatus a performance request to perform a job. When that processor or those processors receive the batch processing notification, it or they display on its or their displaying means a message that it or they are invited to transmit to the management apparatus a performance request to perform a job.

It is preferable that the image forming apparatus should include an image forming means, a controlling means, and an information transmitting means. The image forming means forms an image on a sheet of paper. If the controlling means waits for a job for a time longer than a specified value, this means turns off the image forming means. The information transmitting means transmits switching information to the management apparatus. The switching information indicates that the image forming means is not supplied with power. If, after the receiving means of the management apparatus receives the switching information, this means receives from one of the information processors a performance request to perform a job, the batch processing notifying means of the management apparatus transmits to one or more of the other processors a batch processing notification to inviting it or them to transmit to this apparatus a performance request to perform a job.

In general, if an image forming apparatus waits for a job for a time longer than a specified value, the apparatus turns off its image forming means. Because the management apparatus receives from the image forming apparatus the switching information, which indicates that the image forming means is not supplied with power, the management apparatus can, based on this information, determine whether the image forming means is supplied with power. If, while the image forming means is not supplied with power, the management apparatus receives from one of the information processors a performance request to perform a job, this apparatus notifies one or more of the other processors of batch processing.

Thus, if, while the image forming means is not supplied with power, the management apparatus receives from one of the information processors a performance request to perform a job, this apparatus invites one or more of the other processors to transmit to it a performance request to perform a job. This enables the image forming apparatus to perform the jobs by means of batch processing. As a result, it is possible to reduce the number of times the image forming apparatus turns on and off the image forming means. Consequently, power consumption can be reduced.

It is preferable that each of the information processors should further include an entering means and a transmitting means. A performance request to perform a job can be entered at the entering means with or without a notification request to notify one or more of the other information processors of batch processing. If the performance request is entered with the notification request at the entering means, the transmitting means transmits these requests to the management apparatus. When the receiving means of the management apparatus receives the performance and notification requests, the batch processing notifying means of this apparatus transmits to that processor or those processors a batch processing notification inviting it or them to transmit to the apparatus a performance request to perform a job.

Thus, a performance request to perform a job can be entered into each of the information processors with or without a notification request to notify one or more of the other processors of batch processing. If a performance request to perform a job is entered into one of the information processors with a notification request to notify one or more of the other processors of batch processing, this processor transmits these requests to the management apparatus. When the management apparatus receives the performance and notification requests, this apparatus transmits to that processor or those processors a batch processing notification inviting it or them to transmit to to the apparatus a performance request to perform a job. The management apparatus transmits to the image forming apparatus the job or jobs which the image forming apparatus is requested to perform. Consequently, when the user of each of the information processors enters into it a performance request to perform a job, he/she can, by taking it into account what the job is, determine whether to notify one or more of the other processors of batch processing.

It is preferable that the management apparatus should further include a batch processing storing means. If the batch processing notifying means transmits to at least one of the other processors the batch process notification, the batch processing notifying means of this apparatus transmits to one or more of the other processors a batch processing notification inviting it or them to transmit to the apparatus a performance request to perform a job. The batch processing storing means stores the job for which the batch processing notification was transmitted to that processor or those processors and the information processor or processors which have responded to the notification.

If the receiving means receives from one of the information processors another performance request to perform a job, the batch processing notifying means may transmit, to the information processor or processors associated with a job stored in the batch processing storing means and related to the job for which the receiving means has received this request, a batch processing notification inviting the associated processor or processors to transmit to the management apparatus a performance request to perform a job.

Thus, if the management apparatus receives a performance request to perform a job related to a job for which this apparatus has notified one or more of the information processors of batch processing, the apparatus may notify it or them of batch processing.

By way of example, if the management apparatus receives a request to print minutes, this apparatus may notify of batch processing the information processor or processors which this apparatus has notified of batch processing for the printing of minutes. Likewise, if the management apparatus receives a request to print materials for a meeting, this apparatus may notify of batch processing the information processor or processors which this apparatus has notified of batch processing for the printing of materials for the meeting.

This enables the management apparatus to notify of batch processing one or more appropriate information processors based on past batch processing notifications.

It is preferable that the notification request should include the destination or destinations of the batch processing notification. If the receiving means of the management apparatus receives the performance and notification requests, the batch w processing notifying means of this apparatus transmits the batch processing notification to the destination or destinations included in the notification request.

Thus, the management apparatus transmits the batch processing notification to the destination or destinations included in the notification request. Consequently, when the user of each of the information processors enters into it a performance request to perform a job, he/she can, by taking it into account what the job is, designate the information processor or processors which the management apparatus should notify of batch processing.

It is preferable that each of the information processors should further include a history storing means. The history storing means stores the job for which the performance request has been entered at the associated entering means and the destination or destinations included in the notification request. The entering means of each of the information processors may include a selecting means. The selecting means selects at least one of the destinations stored in the history storing means.

Each of the information processors can make its selecting means select from the destinations of past batch processing notifications one or more information processors which the management apparatus should notify of batch processing. This obviates the user's trouble in selecting the destination or w destinations of a batch processing notification.

It is preferable that, if the receiving means of the management apparatus receives from one of the information processors a performance request to perform a job, the batch processing notifying means of this apparatus should transmit to one or more of the other processors a batch processing notification including the file name of the job and inviting that processor or those processors to transmit to the apparatus a performance request to perform the job.

Thus, if the receiving means receives from one of the information processors a performance request to perform a job, the batch processing notifying means may invite one or more of the other processors to transmit to the management apparatus a performance request to perform the job. This enables the image forming apparatus to do printing for two or more of the information processors by means of batch print.

The image forming apparatus might also function as the management apparatus.

When one of the information processors requests the image forming apparatus to perform a job, one or more of the other processors may request this apparatus to perform a job. This enables the image forming apparatus to perform the jobs by means of batch processing. As a result, in comparison with a case where the image forming apparatus performs jobs one by one, it is possible to reduce the power which this apparatus consumes.

BRIEF DESCRIPTION OF THE DRAWINGS

FIG. 3A is a table showing an example of the batch processing database stored in the memory section of the management apparatus in the first embodiment.

FIG. 3B is a table showing an example of the batch processing database as updated.

FIG. 4A is a table showing an example of the historical database stored in the memory section of one of the personal computers.

FIG. 4B is a table showing an example of the historical database as updated.

DETAILED DESCRIPTION OF THE INVENTION

An image forming system embodying the present invention will be described below with reference to the accompanying drawings. Three embodiments of the invention will be described.

First Embodiment

Figure 1:
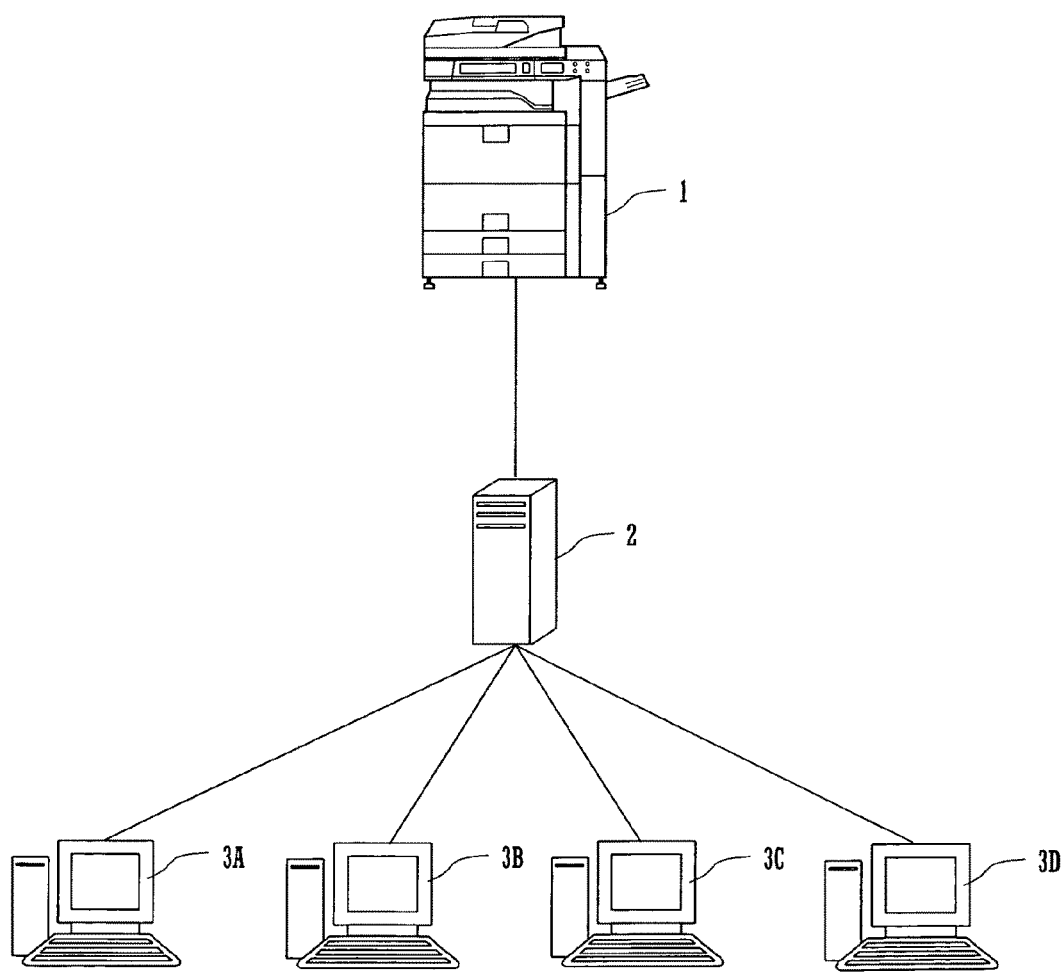
FIG. 1 is a schematic diagram of an image forming system, which consists of an image forming apparatus, a management apparatus and personal computers, according to a first embodiment, a second embodiment and a third embodiment of the present invention.

With reference to FIG. 1, the image forming system includes at least one image forming apparatus 1, a management apparatus 2, and PCs (personal computers) 3A-3D. The PCs 3A-3D, which correspond to the information processors of the present invention, are connected to the management apparatus 2 through a network. The management apparatus 2 is connected to the image forming apparatus 1 through the network.

When the user of one of the PCs 3A-3D enters into it a request to perform a job, he/she may also enter into it a request to notify one or more of the other PCs of batch processing for the job.

By way of example, if the user of the PC 3A enters into it only a request to perform a job, it transmits the request to the management apparatus 2. When the management apparatus 2 receives the request, this apparatus transmits the job to the image forming apparatus 1, which then performs the job.

If the user of the PC 3A enters into it a request to perform a job and a request to notify one or more of the other PCs 3B-3D of batch processing for the job, the PC 3A transmits m the two requests to the management apparatus 2. When the management apparatus 2 receives the requests from the PC 3A, this apparatus transmits to that PC or those PCs a batch processing notification for the job. The notification invites that PC or those PCs to request the image forming apparatus to perform a job.

If, within a specified length of time after the transmission of the batch processing notification, the management apparatus 2 receives from the invited PC or at least one of the invited PCs a request to perform a job, this apparatus transmits to the image forming apparatus 1 this job and the job which the PC 3A requests the image forming apparatus 1 to perform. The apparatus 1 then performs the jobs by means of batch processing.

Thus, when the PC 3A transmits to the management apparatus 2 a request to perform a job, this PC may request this apparatus to invite one or more of the other PCs 3B-3D to request the image forming apparatus 1 to perform a job. This enables the image forming apparatus 1 to perform the jobs by means of batch processing.

Figure 2:
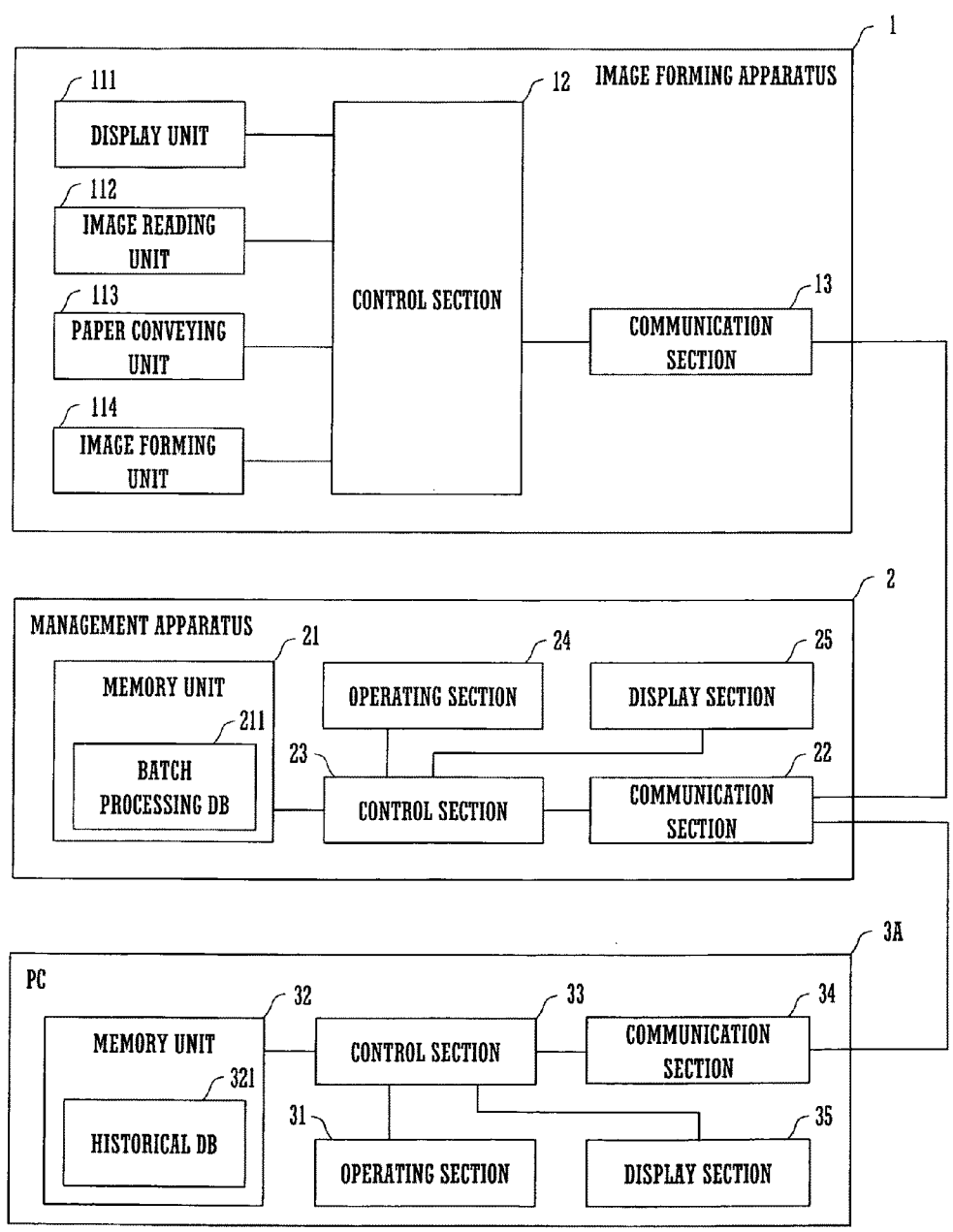
FIG. 2 is a block diagram of the image forming apparatus, the management apparatus, and one of the personal computers.

With reference to FIG. 2, the image forming apparatus 1 consists of function units 111-114 for image processing, a control section 12, and a communication section 13. The apparatus 1 will be described below as a compound apparatus having a plurality of functions for image processing. The to apparatus 1 may be a printer having a printing function.

The control section 12 controls the function units 111-114 and communication section 13. The communication section 13 is connected to the communication section 22 of the management apparatus 2 and receives a job or jobs from the management apparatus 2. By controlling the function units 111-114, the control section 12 performs the job/s input to it from the communication section 13.

The function units are a display unit 111, an image reading unit 112, a paper conveying unit 113, and an image forming unit 114. The display unit 111 is a display panel, where a user makes an entry into the image forming apparatus 1, and which displays pieces of information. The reading unit 112 is a scanner, which reads the image on a document and generates image data. The conveying unit 113 feeds a sheet of paper from a paper holding section to the forming unit 114. The holding section holds sheets of paper to which images can be transferred. The conveying unit 113 delivers the fed sheet from the forming unit 114 to a delivery section. While the conveying unit 113 is conveying the sheet through the forming unit 114, the forming unit forms on the sheet an image based on the image data.

The image forming apparatus 1 might include other function units.

The management apparatus 2 consists of a memory section 21, the communication section 22, a control section 23, an operating section 24, and a display section 25.

The operating section 24 includes a keyboard and a mouse, with which a user makes an entry into the management apparatus 2. By way of example, if the user enters at the operating section 24 an instruction to start or stop the management apparatus 2, this section outputs an operation instruction signal to the control section 23.

The display section 25 is a monitor, which displays the data output from the control section 23.

The memory section 21 stores the programs which the control section 23 executes and a batch processing DB (database) 211, which is shown as an example by FIGS. 3A and 3B. The DB 211 contains job data, each of which consists of:

the ID of the PC having transmitted to the management apparatus 2 a request to perform a job; the file name of the job;

the printing date representing the date when the management apparatus 2 received the request;

a keyword or keywords representing the type of the job (weekly report, materials for a meeting, minutes of the meeting, or the like) with or without the name of the group (meeting A, project A, or the like) to which the job belongs; and the name/s of the user/s of the PC/s which the management apparatus 2 was requested to notify of batch processing for the job.

The control section 23 updates the batch processing DB 211 every time the management apparatus 2 receives from one of the PCs 3A-3D a request to perform a job and a request to notify one or more of the other PCs of batch processing for the job.

The communication section 22 controls the data transmission to and the data reception from the image forming apparatus 1 and PCs 3A-3D in accordance with instructions from the control section 23.

The control section 23 includes a temporary memory and controls the function sections of the management apparatus 2 in accordance with an operation instruction signal from the operating section 24.

If the control section 23 receives from one of the PCs 3A-3D via the communication section 22 only a request to perform a job, the control section 23 temporarily stores the job in its temporary memory and subsequently transmits the job to the image forming apparatus 1.

The control section 23 may receive from one of the PCs 3A-3D via the communication section 22 a request to perform a job and a request to notify one or more of the other PCs of batch processing for the job. In this case, the control section 23 transmits a batch processing notification for the job via the communication section 22 to that PC or those PCs.

Each of the PCs 3A-3D (PCs 3B-3D are not shown in FIG. 2) includes an operating section 31, a memory section 32, a control section 33, a communication section 34, and a display section 35.

The memory section 32 stores the programs for carrying out applications, the data input to it from the operating section 31 and communication section 34, and a historical DB (database) 321, which is shown as an example by FIGS. 4A and 4B. The DB 321 contains job data, each of which consists of:

the file name of a job;

the printing date representing the data when the associated PC transmitted to the management apparatus 2 a request to perform the job;

a keyword or keywords; and the name/s of the user/s of the PC/s which the management apparatus 2 was requested to notify of batch processing for the job.

The control section 33 updates the historical DB 321 every time the associated PC transmits to the management apparatus 2 a request to notify one or more of the other PCs of batch processing.

The operating section 31 includes a keyboard and a mouse or another pointing device, with which the associated user makes an entry into the associated PC.

If the user enters at the operating section 31 a request to perform a job relating to image or document printing, this section outputs an operation instruction signal to the control section 33.

Likewise, if the user enters at the operating section 31 a request to perform a job and a request to notify one or more of the other PCs of batch processing for the job, this section outputs an operation instruction signal to the control section 33.

In accordance with an operation instruction signal from the operating section 31, the control section 33 executes one or more of the programs in the memory section 32.

If the user enters at the operating section 31 only a request to perform a job, the control section 33 transmits the request via the communication section 34 to the management apparatus 2.

If the user enters at the operating section 31 a request to perform a job and a request to notify one or more of the other PCs of batch processing for the job, the control section 33 transmits the two requests via the communication section 34 to the management apparatus 2.

By way of example, the PC 3A may transmit to the management apparatus 2 a request to perform a job and a request to notify the PCs 3B and 3D of batch processing for the job, which is based on a request to print a file "minutes of meeting A.doc". The PC 3B may respond to the notification of batch processing. The processing which each of the PC 3A, management apparatus 2 and image forming apparatus 1 performs in such a case will be described below with reference to FIGS. 3A-10.

One of the application programs stored in the memory section 32 of each of the PCs 3A-3D may be an editor.

Figure 6:
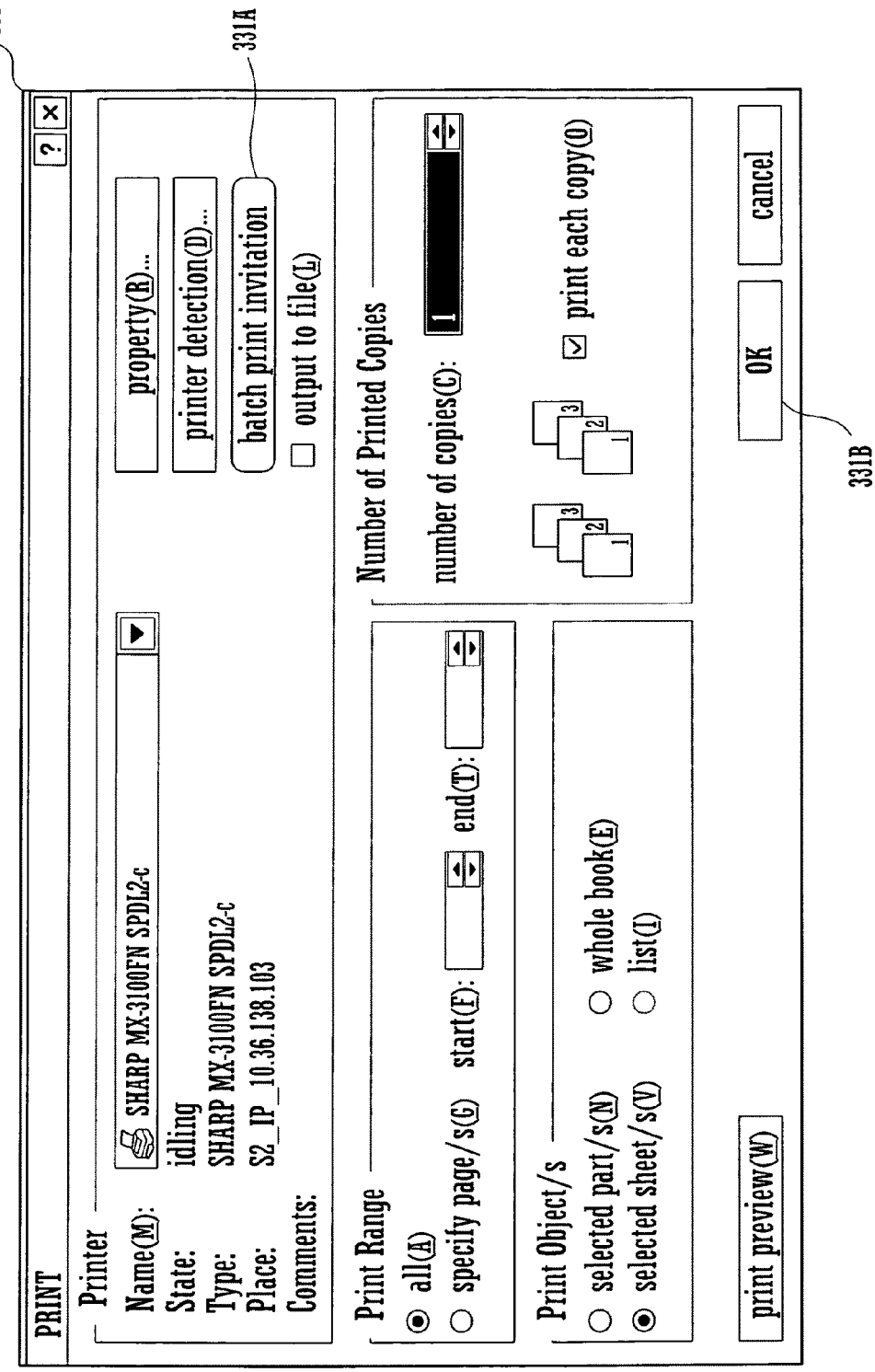
FIG. 6 shows an example of the print screen displayed on the display section of one of the personal computers.

If a request to print the file "minutes of meeting A.doc" is entered into the PC 3A while the associated editor is active, the associated control section 33 activates the associated printer driver, displaying on the associated display section 35 a print screen 331, which is shown as an example by FIG. 6. The screen 331 includes "batch print invitation" button 331A.

Figure 5:
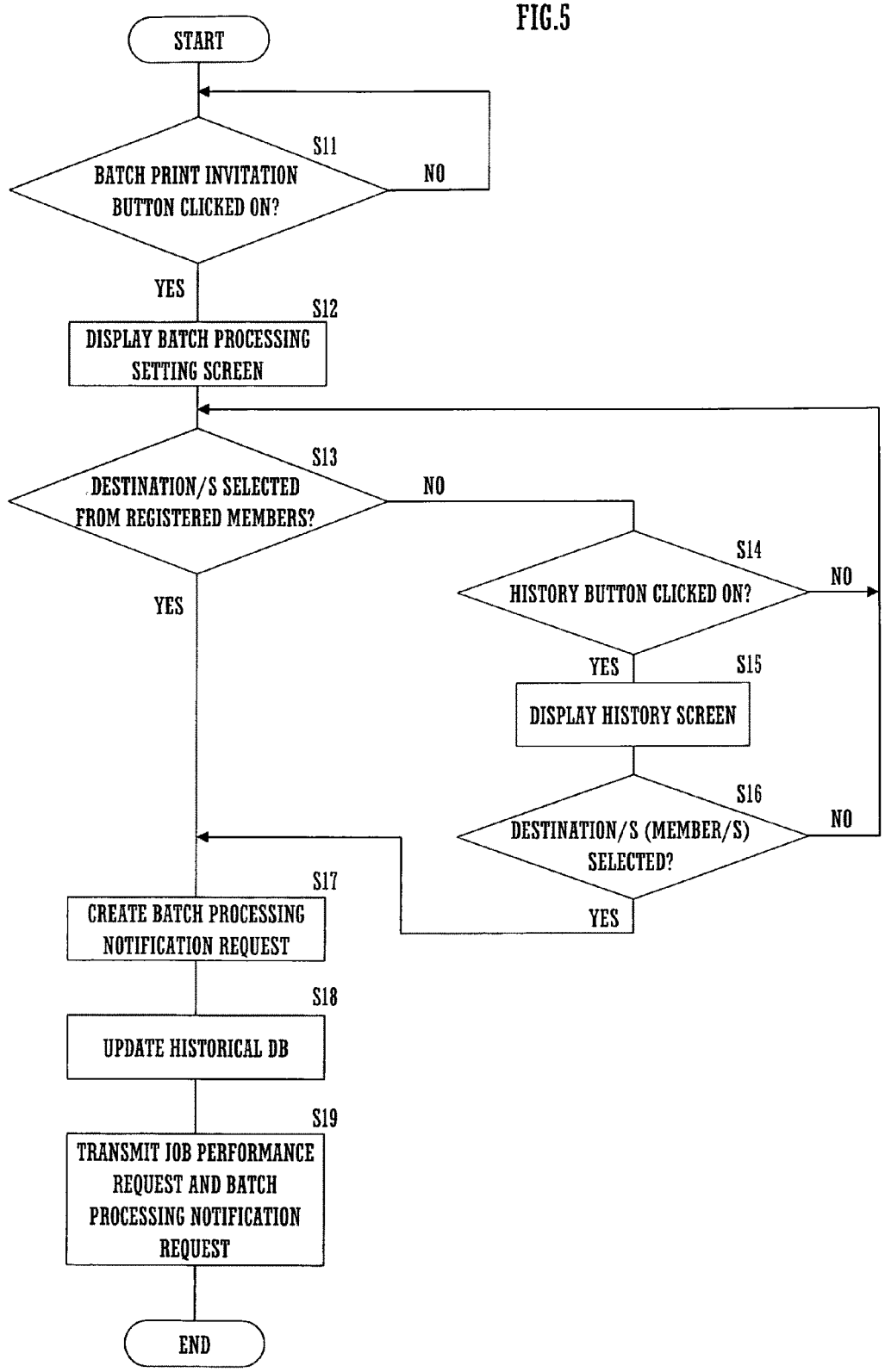
FIG. 5 is a flowchart of the processing performed by the control section of each of the personal computers when the computer requests the management apparatus to notify one or more of the other computers of batch processing.
Figure 7:
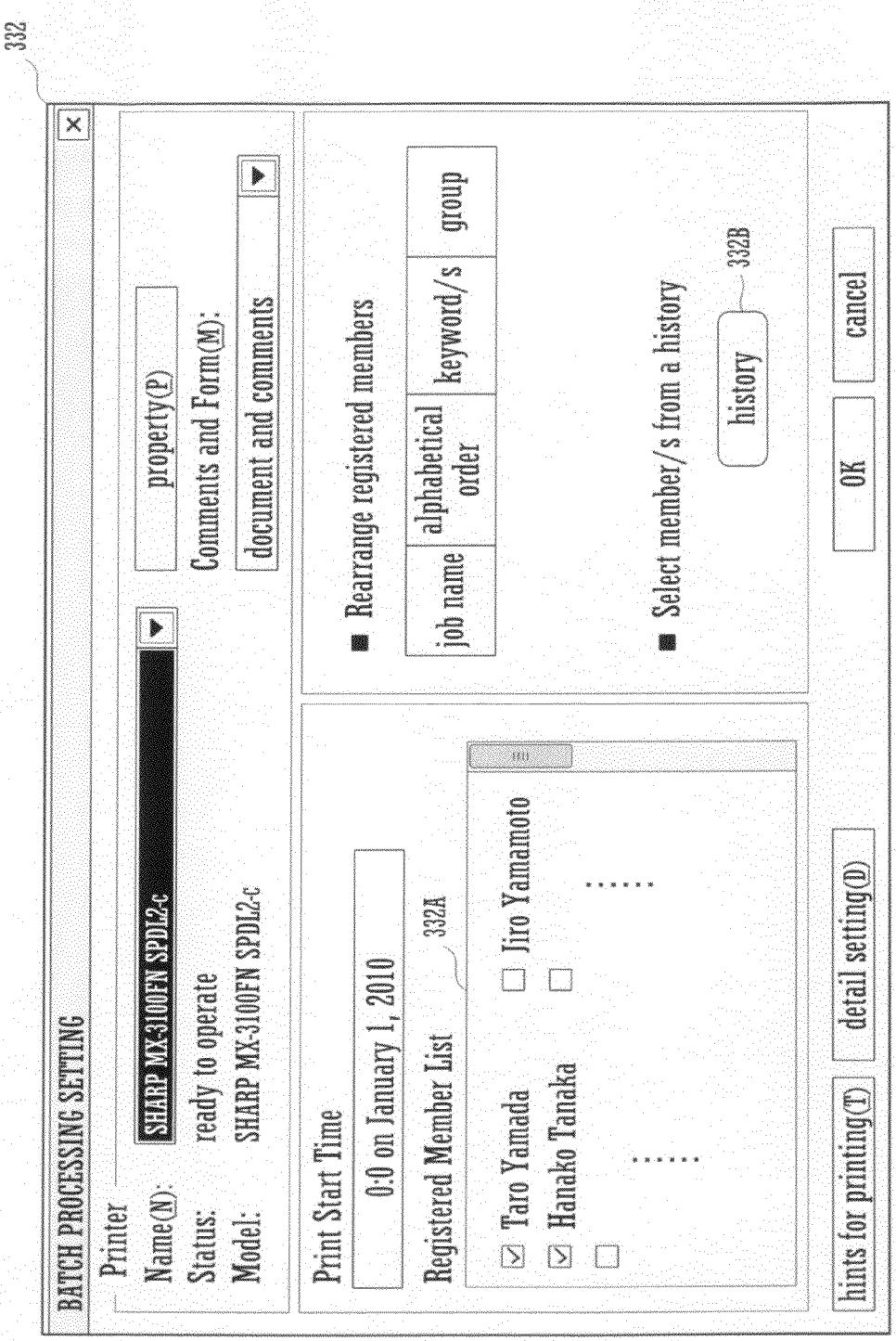
FIG. 7 shows an example of the batch processing setting screen displayed on the display section of one of the personal computers.

With reference to FIG. 5, if the control section 33 detects that "batch print invitation" button 331A has been clicked on (S11), this section displays on the display section 35 a batch processing setting screen 332 (S12), which is shown as an example by FIG. 7. The screen 332 includes a registered member list 332A and "history" button 332B. The members registered on the list 332A are the users of the other PCs 3B-3D. The PC 3A user can select one or more of the registered members as the member/s whom this PC requests the management apparatus 2 to notify of batch processing for the job based on the request to print the file "minutes of meeting A.doc".

If the control section 33 detects that the PC 3A user has selected keywords "minutes of meeting A" for the job and Taro Yamada (PC 3B) and Hanako Tanaka (PC 3D) from the registered member list 332A (S13), this section creates a request to notify the selected members of batch processing for the job (S17). This request includes the file name "minutes of meeting A.doc" of the job, the keywords, and these members' names.

Subsequently, the control section 33 updates the historical DB 321 shown by FIG. 4A (S18). FIG. 4B shows the DB 321 as updated. Subsequently, the control section 33 transmits to the management apparatus 2 the request to perform the job based on the request to print the file "minutes of meeting A.doc" and the request to notify the selected members of batch processing for the job (S19).

Instead of selecting one or more of the members on the registered member list 332A, the PC 3A user may designate the member/s whom this PC has requested the management apparatus 2 to notify of batch processing for a job.

Figure 8:
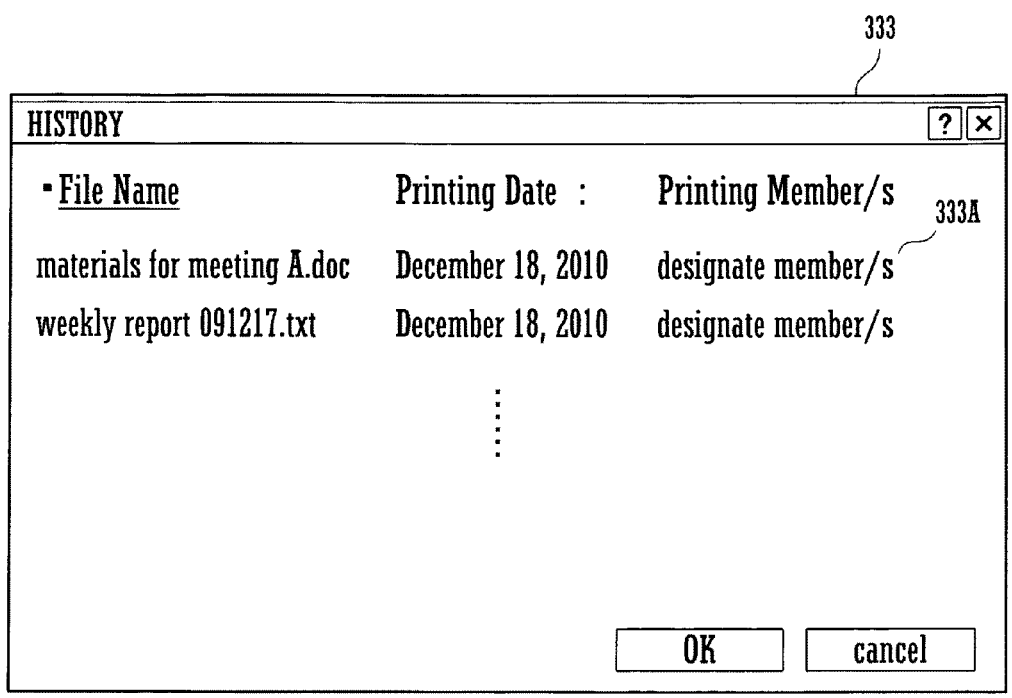
FIG. 8 shows an example of the history screen displayed on the display section of one of the personal computers.

If the control section 33 detects that the PC 3A user has clicked on "history" button 332B on the batch processing setting screen 332 (S14) without selecting one or more of the members on the registered member list 332A, this section displays on the display section 35 a history screen 333 (S15), which is shown as an example by FIG. 8, by referring to the historical DB 321 (FIG. 4A). The history screen 333 shows historical information on the printed files for each of which the PC 3A has requested the management apparatus 2 to notify one or more of the other PCs of batch processing for a job. The historical information consists of the names of the printed files, printing dates, and printing members 333A. The member/s 333A for each of the printed files is/are associated with the user/s for the same file in the historical DB 321.

By clicking "Member Selection" at the printed file "materials for meeting A.doc" on the history screen 333 with the mouse or pointing device, the PC 3A user can designate all of Taro Yamada (PC 3B), Jiro Yamamoto (PC 3C), et al., who are associated with this file.

If the control section 33 detects that the member/s for one of the printed files on the history screen 333 has/have thus been designated (S16), this section creates a request to notify the designated member/s of batch processing for the job based on the request to print the file "minutes of meeting A.doc" (S17). Subsequently, the control section 33 proceeds to S18.

Thus, the PC 3A user can either select one or more of the users of the other PCs 3B-3D or designate the member/s whom this PC has requested the management apparatus 2 to notify of batch processing for a job. The designation obviates the troublesome selection.

Figure 9:
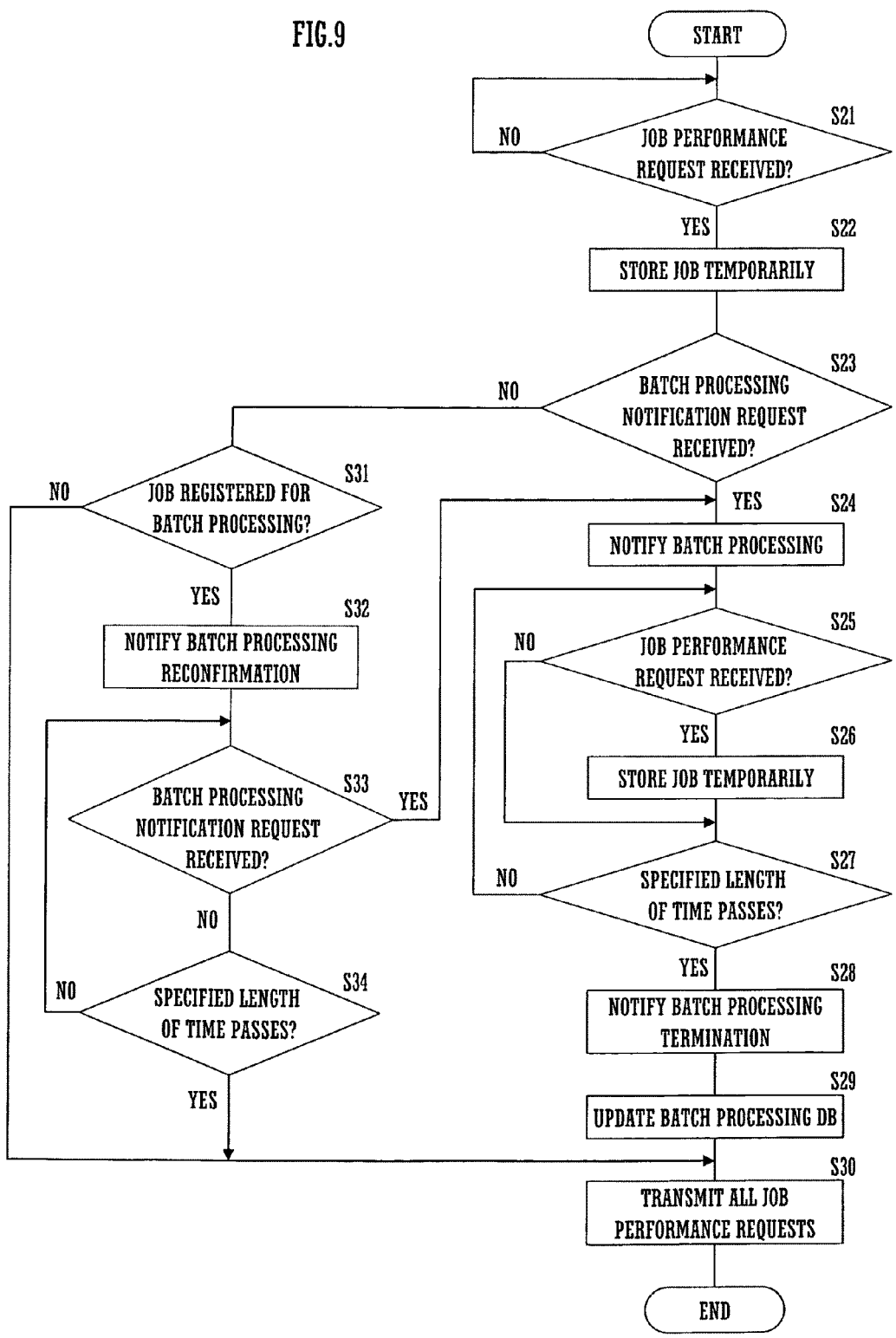
FIG. 9 is a flowchart of the processing performed by the control section of the management apparatus in the first embodiment when one of the personal computers requests the apparatus to notify one or more of the other computers of batch processing.

With reference to FIG. 9, when the control section 23 of the management apparatus 2 receives the request to perform the job based on the request to print the file "minutes of meeting A.doc" (S21), this section stores the job temporarily in its temporary memory (522).

If the control section 23 receives the request to notify Taro Yamada (PC 3B) and Hanako Tanaka (PC 3D) of batch processing for this job (S23), this section transmits to the PCs 3B and 3D a batch processing notification for the job (S24). The notification invites these PCs to request the image forming apparatus 1 to perform a job.

If, within the specified length of time after the transmission of the batch processing notification (S27), the control section 23 receives from the PC 3B a request to perform a job (S25), this section stores this job temporarily in its temporary memory (S26).

If the specified length of time passes after the transmission of the batch processing notification (S27), the control section 23 transmits to the PCs 3B and 3D a batch processing termination notification indicating that this section has terminated the invitation to transmit a request to perform a job (S28).

Subsequently, the control section 23 updates the batch processing DB 211 shown by FIG. 3A (S29). FIG. 3B shows the DB 211 as updated. Subsequently, the control section 23 transmits to the image forming apparatus 1 the job/s stored in the temporary memory of this section (S30).

As stated above, the management apparatus 2 may receive from the PC 3A a request to perform a job and a request to notify the PCs 3B and 3D of batch processing notification for the job. In this case, the management apparatus 2 transmits to the PCs 3B and 3D a batch processing notification for the job.

The PC 3B may respond to the notification by transmitting to the management apparatus 2 a request to perform a job. This enables the image forming apparatus 1 to perform the two jobs by means of batch processing.

The control section 23 may, without receiving a batch processing notification, receive only the request to perform the job based on the request to print the file "minutes of meeting A.doc". In this case, by referring to the batch processing DB 211 shown by FIG. 3A, the control section 23 determines whether the job is a job registered for batch processing (S31). The determination is based on whether a keyword or keywords for the job based on the request to print the file is/are similar to one or more of the keywords registered in the DB 211. The keyword/s for the job is/are part (meeting A) or all (minutes of meeting A) of the file name of the job.

If the keyword/s for the job based on the request to print the file is/are similar to one or more of the registered keywords, the control section 23 determines that the job is a job registered for batch processing. In this case, the control section 23 transmits to the PC 3A a batch processing reconfirmation notification based on information including the file name of and the keyword/s for the registered job (S32).

Figure 10:
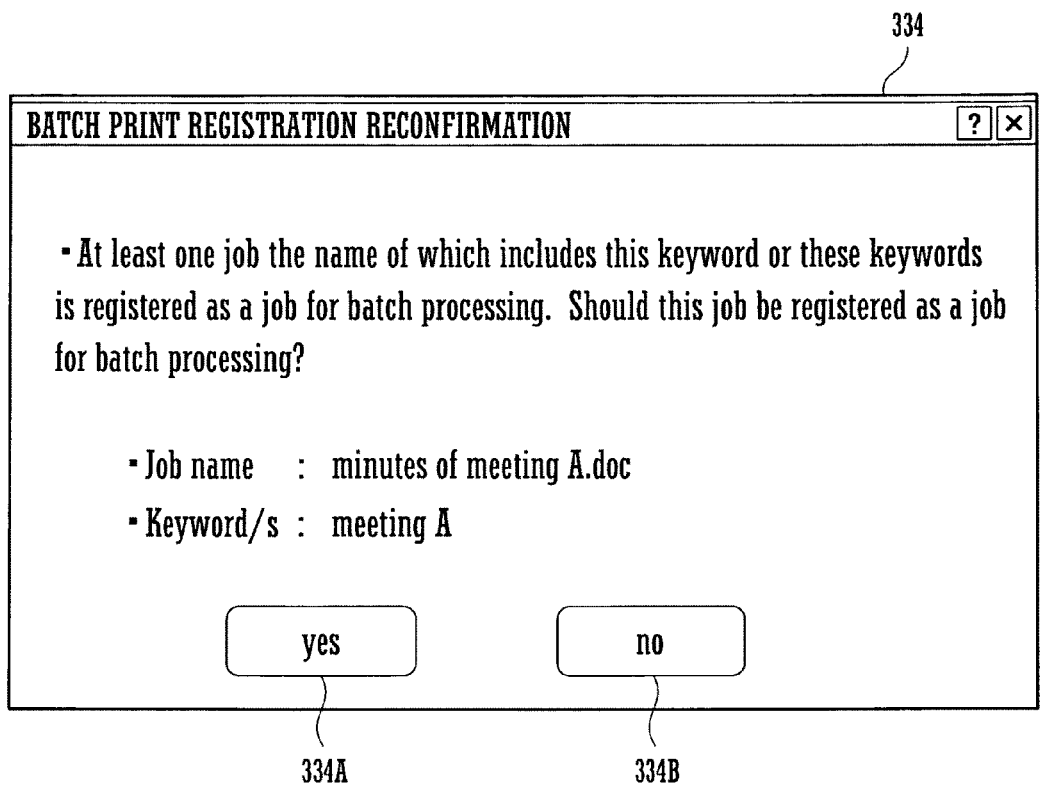
FIG. 10 shows an example of the batch print registration reconfirmation screen displayed on the display section of one of the personal computers.

When the control section 33 of the PC 3A receives the batch processing reconfirmation notification, this section displays on the display section 35 a batch print registration reconfirmation screen 334, which is shown as an example by FIG. 10. The screen 334 includes "yes" button 334A and "no" button 334B.

If the control section 33 detects that "yes" button 334A has been clicked on, this section transmits to the management apparatus 2 a request to notify of batch processing for the job based on the request to print the file the member/s whom this apparatus has been requested to notify of batch processing for the job.

If, within a specified length of time after the transmission of the batch processing reconfirmation notification to the PC 3A (S34), the control section 23 of the management apparatus 2 receives from this PC the request to notify that member or those members (S33), this section proceeds to S24.

If the control section 33 of the PC 3A detects that "no" button 334B on the batch print registration reconfirmation screen 334 has been clicked on, this section does nothing.

As stated above, the management apparatus 2 may receive from one of the PCs 3A-3D a request to perform a job and no request to notify one or more of the other PCs of batch processing for the job. Even in this case, if the job is a job registered for batch processing, the apparatus 2 can transmit a batch processing notification to the member/s to whom the apparatus has been requested to notify of batch processing for the registered job.

In this embodiment, the determination at S31 whether the job based on the request to print the file is a job registered for batch processing is based on whether a keyword or keywords for the job based on the request to print the file is/are similar to one or more of the keywords registered in the batch processing DB 211. Alternatively, the determination might be based on whether the file name of the job based on the request to print the file is similar to one of the file names registered in the DB 211.

In this embodiment, the registered member list 332A on the batch processing setting screen 332 (FIG. 7) contains the PCs 3B-3D connected to the management apparatus 2. Alternatively, the list 332A might contain the PCs 3B-3D connected to the PC 3A.

Second Embodiment

In the first embodiment, the PC 3A transmits a request to notify one or more of the PCs 3B-3D of batch processing. In the second embodiment, if the management apparatus 2 receives from one of the PCs 3A-3D a request to perform a job, this apparatus transmits a batch processing notification to one or more of the other PCs. The differences between the two embodiments will be described below.

Figure 12:
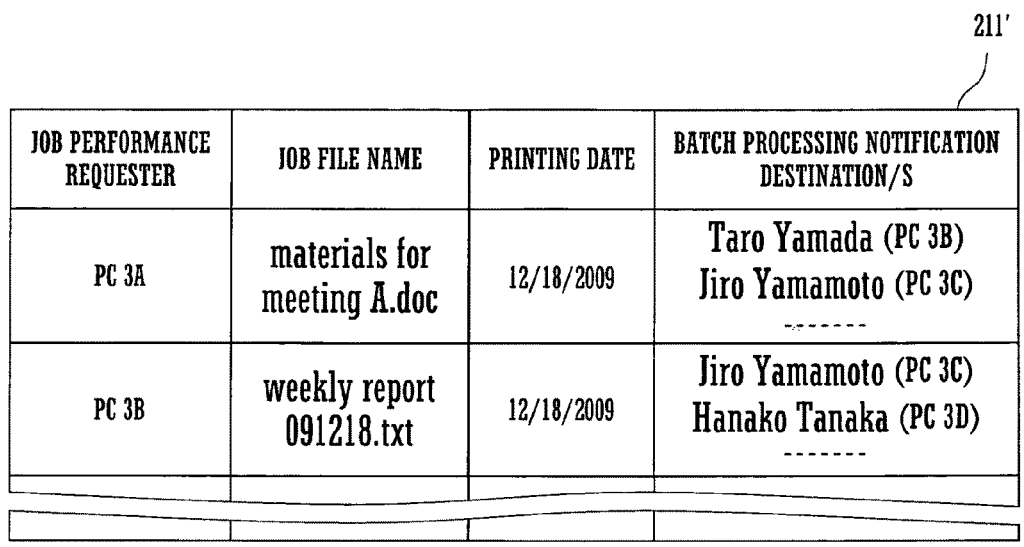
FIG. 12 is a table showing an example of the batch processing database stored in the memory section of the management apparatus in the second embodiment.

In the second embodiment, the memory section 32 of each of the PCs 3A-3D does not store the historical DB 321. In this embodiment, the memory section 21 of the management apparatus 2 stores a batch processing DB 211' as shown by FIG. 12. The DB 211' contains job data, each of which contains:

the ID of the PC having transmitted to the management apparatus 2 a request to perform a job;

the file name of the job;

the printing date representing the date when the management apparatus 2 received the request; and the name/s of the user/s of the PC/s which the management apparatus 2 was requested to notify of batch processing for the job.

The batch processing DB 211' differs from the batch processing DB 211 in including no keyword.

Figure 11:
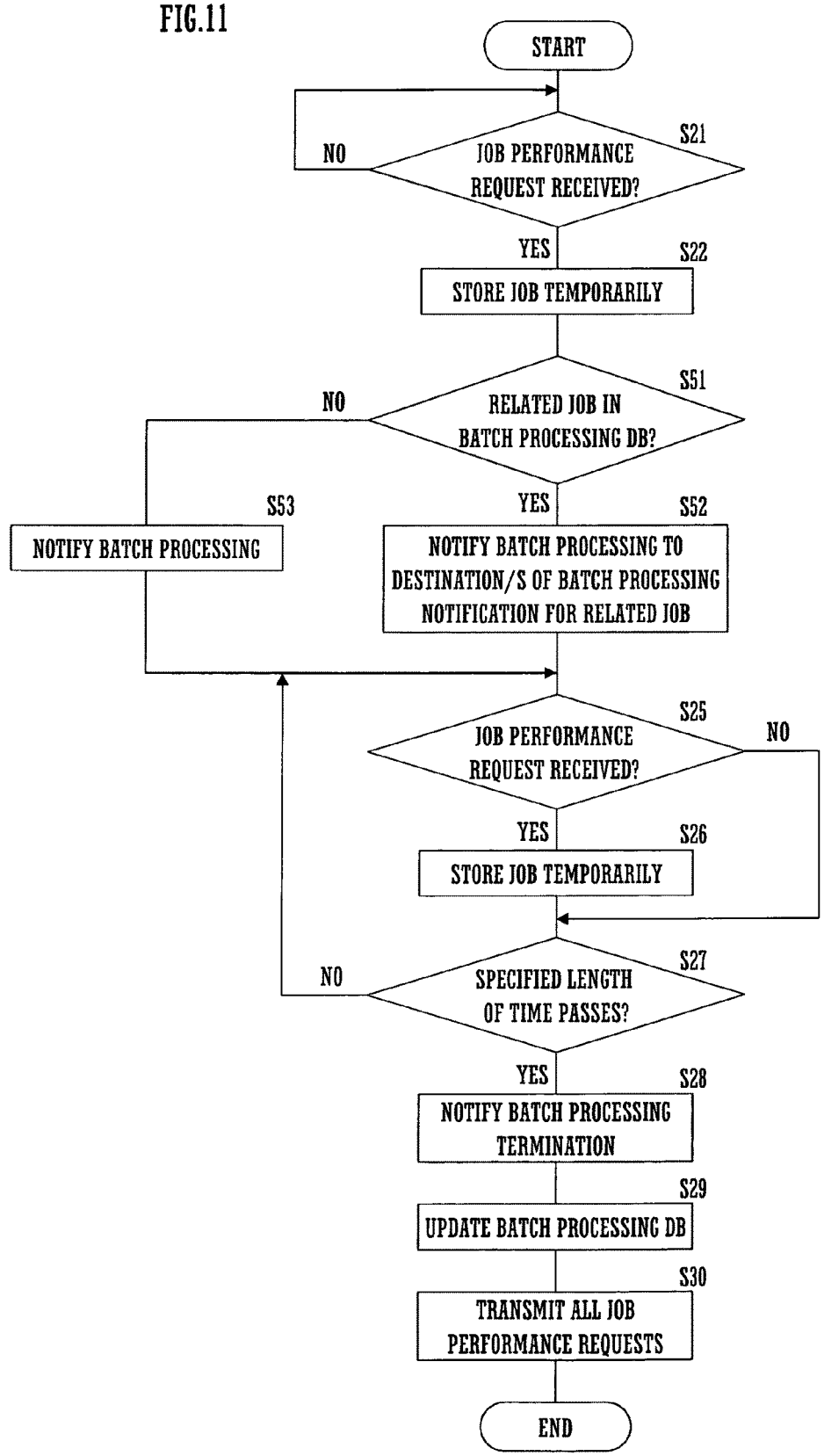
FIG. 11 is a flowchart of the processing performed by the control section of the management apparatus in the second embodiment when one of the personal computers requests the apparatus to notify one or more of the other computers of batch processing.

With reference to FIG. 11, if the control section 23 of the management apparatus 2 receives from the PC 3A a request to perform a job (S21), this section stores the job temporarily in its temporary memory (S22).

Subsequently, the control section 23 determines whether any of the jobs registered in the batch processing DB 211' is related to the stored job (S51). If the file name of one of the registered jobs is similar to that of the stored job, the control section 23 determines that this registered job is related to the stored job.

If the control section 23 determines that one of the registered jobs is related to the stored job, this section transmits a batch processing notification for the stored job to the member/s whom the management apparatus 2 has been requested lo to notify of batch processing for the related job (S52). Subsequently, the section 23 proceeds to S25.

If the control section 23 determines that none of the registered jobs is related to the stored job, this section transmits a batch processing notification for the stored job to the PCs 3B-3D (S53). Subsequently, the section 23 proceeds to S25.

As stated above, if the management apparatus 2 receives from one of the PCs 3A-3D a request to perform a job to which another job is related, this apparatus transmits a batch processing notification for this job to the member/s whom the apparatus has been requested to notify of batch processing for the related job. If the apparatus 2 receives from one of the PCs 3A-3D a request to perform a job to which no other job is related, this apparatus transmits a batch processing notification for this job to the other PCs. As a result, the apparatus 2 can transmit a batch processing notification to one or more appropriate members based on whom the apparatus has been requested to notify of batch processing.

Third Embodiment

The third embodiment differs from the first and second embodiments in that, in this embodiment, the management apparatus 2 transmits a batch processing notification only while the image forming apparatus 1 is not supplied with power. The differences between the first and third embodiments will be described below.

If the control section 12 of the image forming apparatus 1 waits for a job for a time longer than a specified value, this section turns off the paper conveying unit 113 and image forming unit 114.

If the control section 12 receives a job while the paper conveying unit 113 and image forming unit 114 are not supplied with power, this section turns on these units so that the image forming apparatus 1 can perform the job.

When the control section 12 turns on or off the paper conveying unit 113 and image forming unit 114, this section transmits to the management apparatus 2 information indicating whether these units are supplied with power.

After S22 in FIG. 9 or 11, the control section 23 of the management apparatus 2 determines, based on the information from the control section 12 of the image forming apparatus 1, whether the paper conveying unit 113 and image forming unit 114 are supplied with power.

If the paper conveying unit 113 and image forming unit 114 are not supplied with power, the control section 23 of the management apparatus 2 proceeds to S23 in FIG. 9 or S51 in FIG. 11. If the units 113 and 114 are supplied with power, the section 23 proceeds to S30 in FIG. 9 or 11.

In this embodiment, when the control section 12 of the image forming apparatus 1 turns on or off the paper conveying unit 113 and image forming unit 114, this section transmits to the management apparatus 2 information indicating whether these units are supplied with power.

Alternatively, while the paper conveying unit 113 and image forming unit 114 are not supplied with power, the control section 12 might keep transmitting to the management apparatus 2 information indicating that these units are not supplied with power.

If the control section 12 of the image forming apparatus 1 turns on the paper conveying unit 113 and image forming unit 114, the management apparatus 2 transmits a batch processing notification. As a result, it is possible to reduce the number of times the section 12 turns on the units 113 and 114. This makes it possible to reduce power consumption.

In the three embodiments, after the management apparatus 2 transmits a batch processing notification for a job, this apparatus may receive a request to perform another job.

Alternatively, after the management apparatus 2 transmits a batch processing notification for a job, this apparatus might receive a request to print the job.

In this case, if the PC 3A transmits to the management apparatus 2 a request to print the file "minutes of meeting A.doc", this apparatus may transmit to the PCs 3B-3D a batch processing notification including the name of the file and the IDs of these PCs.

Figure 13:
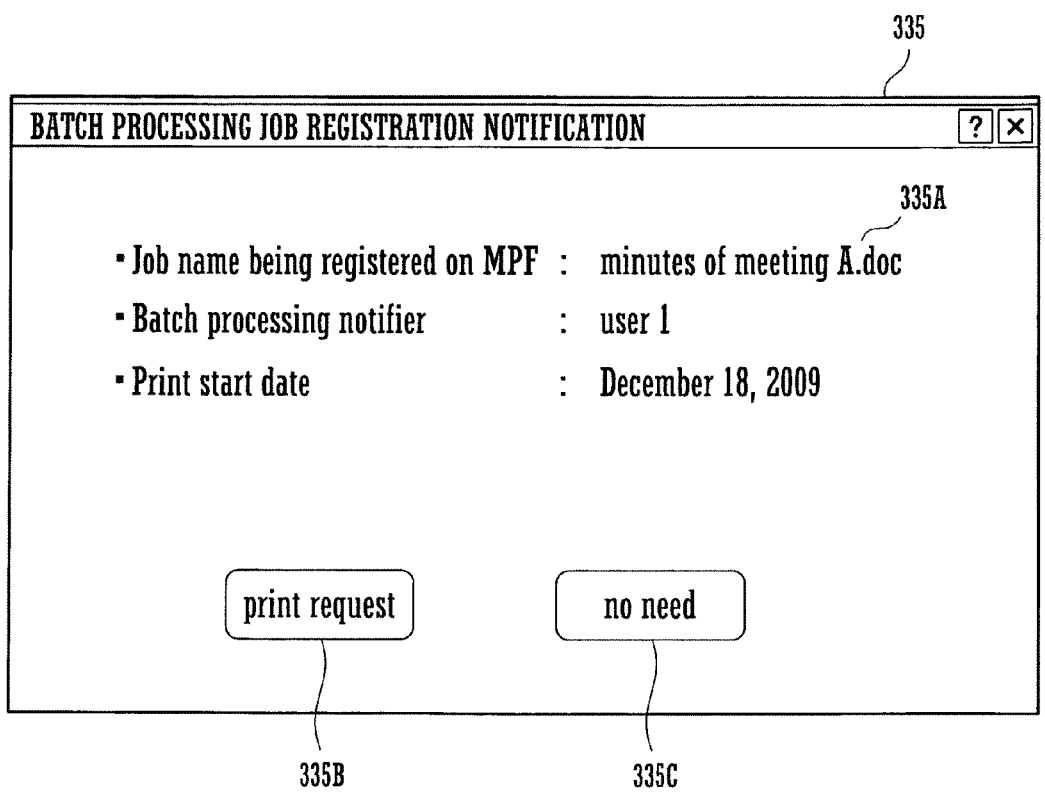
FIG. 13 shows an example of the batch processing job registration notification screen displayed on the display section of one of the personal computers.

If the control section 33 of each of the PCs 3B-3D receives the batch processing notification, this section displays on the associated display section 35 a batch processing job registration notification screen 335, which is shown as an example by FIG. 13.

If the file name of the batch processing job on the batch processing job registration notification screen 335 is selected, the control section 33 opens the file so that the contents of the file can be referred to.

Figure 14:
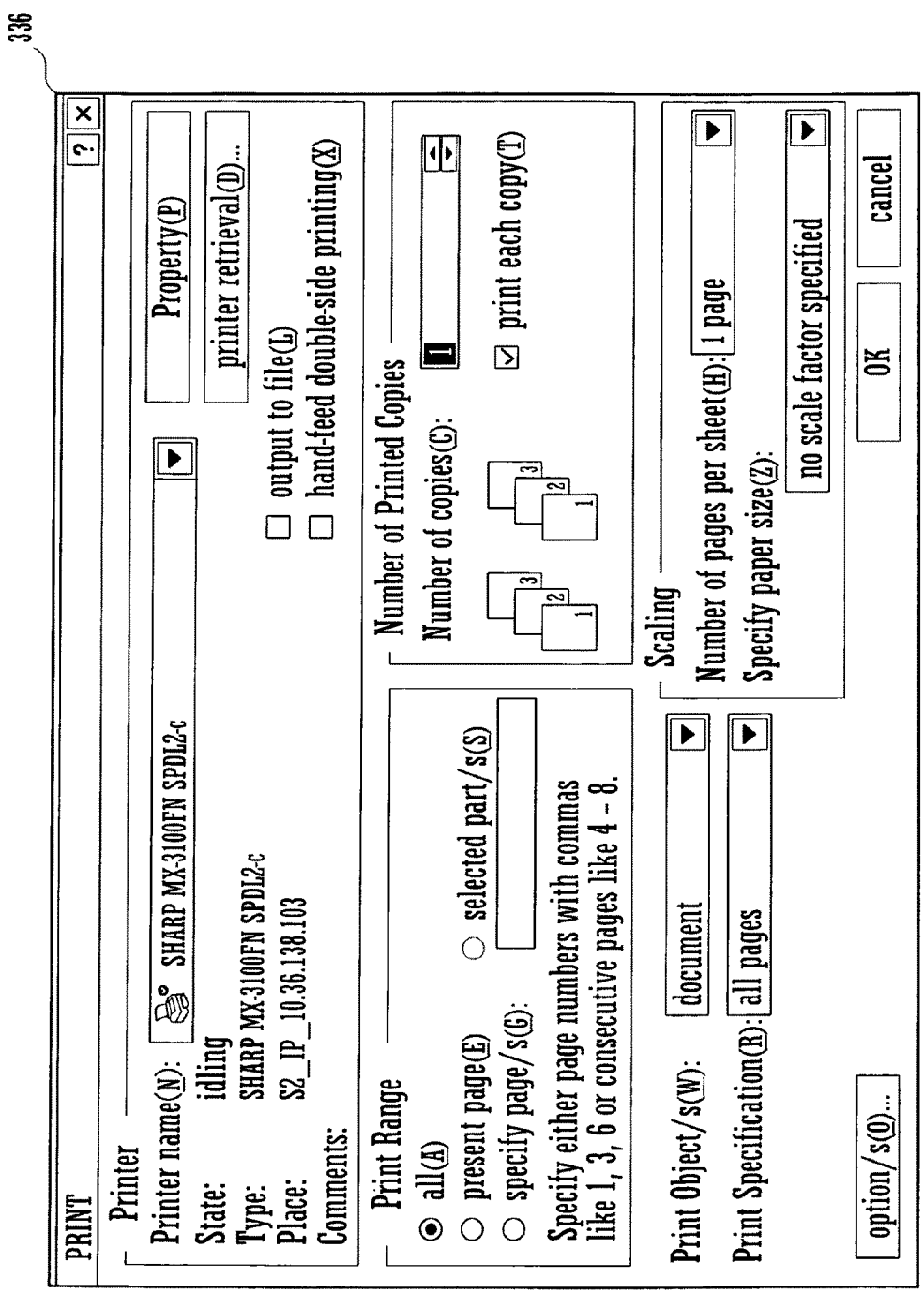
FIG. 14 shows another example of the print screen.

If the control section 33 detects that "print request" button 335B on the batch processing job registration notification screen 335 has been clicked on, this section activates the associated printer driver, displaying on the display section 35 a print screen 336, which is shown as an example by FIG. 14.

If printing conditions such as the number of copies and paper size are entered in the print screen 336, the control section 33 transmits to the management apparatus 2 a request to perform the job under the entered conditions.

If the control section 33 detects that "no need" button 335C on the batch processing job registration notification screen 335 has been clicked on, this section closes this screen and does nothing further.

This enables the image forming apparatus 1 to print the file by means of batch processing instead of printing it two or more times.

In the three embodiments, the image forming system consists of at least one image forming apparatus 1, one management apparatus 2, and PCs 3A-3D.

Alternatively, the image forming system might consist of at least one image forming apparatus 1 and PCs 3A-3D. In this case, the image forming apparatus 1 might also function as the management apparatus 2.

The present invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An image forming system comprising:
a plurality of information processors each including a displaying means;
a management apparatus connected to the information processors;
the management apparatus including a receiving means for receiving from any one of the information processors a performance request to perform a job;
the management apparatus further including a batch processing notifying means; and
an image forming apparatus connected to the management apparatus for receiving the job from the management apparatus and performing the received job;
wherein, when the receiving means receives the performance request, the batch processing notifying means transmits to at least one of the other information processors a batch processing notification inviting said at least one of the other processors to transmit to the management apparatus a performance request to perform a job;
wherein, when said at least one of the other processors receives the batch processing notification, the associated displaying means displays information that said at least one of the other processors is invited to transmit to the management apparatus a performance request to perform a job,
wherein the image forming apparatus includes;
an image forming means for forming an image on a sheet of paper;
a controlling means for turning off the image forming means if the controlling means waits for a job for a time longer than a specified value; and
an information transmitting means for transmitting switching information to the management apparatus, the switching information indicating that the image forming means is not supplied with power; and
wherein if, after the receiving means of the management apparatus receives the switching information, the receiving means receives from one of the information processors a performance request to perform a job, the batch processing notifying means of the management apparatus transmits to at least one of the other processors a batch processing notification inviting said at least one of the other processors to transmit to the management apparatus a performance request to perform a job.

2. An image forming system comprising:
a plurality of information processors each including a displaying means;
a management apparatus connected to the information processors;
the management apparatus including a receiving means for receiving from any one of the information processors a performance request to perform a job;
the management apparatus further including a batch processing notifying means; and
an image forming apparatus connected to the management apparatus for receiving the job from the management apparatus and performing the received job;
wherein, when the receiving means receives the performance request, the batch processing notifying means transmits to at least one of the other information processors a batch processing notification inviting said at least one of the other processors to transmit to the management apparatus a performance request to perform a job;
wherein, when said at least one of the other processors receives the batch processing notification, the associated displaying means displays information that said at least one of the other processors is invited to transmit to the management apparatus a performance request to perform a job,
wherein each of the information processors further includes:
an entering means where a performance request to perform a job can be entered with or without a notification request to notify at least one of the other information processors of batch processing; and
a transmitting means for transmitting the performance and notification requests to the management apparatus if the performance request is entered with the notification request at the entering means; and
wherein, when the receiving means of the management apparatus receives the performance and notification requests, the batch processing notifying means of the management apparatus transmits to said at least one of the other processors a batch processing notification inviting said at least one of the other processors to transmit to the management apparatus a performance request to perform a job.

3. An image forming system as claimed in claim 2, wherein the notification request includes the destination or destinations of the batch processing notification; and
wherein, if the receiving means of the management apparatus receives the performance and notification requests, the batch processing notifying means of the management apparatus transmits the batch processing notification to the destination or destinations.

4. An image forming system as claimed in claim 3, wherein each of the information processors further includes a history storing means for storing the job for which the performance request has been entered at the associated entering means and the destination or destinations included in the notification request; and
wherein the entering means of each of the information processors includes a selecting means for selecting at least one of the destinations stored in the history storing means.

5. An image forming system comprising:
a plurality of information processors each including a displaying means;
a management apparatus connected to the information processors;

the management apparatus including a receiving means for receiving from any one of the information processors a performance request to perform a job;

the management apparatus further including a batch processing notifying means; and an image forming apparatus connected to the management apparatus for receiving the job from the management apparatus and performing the received job;

wherein, when the receiving means receives the performance request, the batch processing notifying means transmits to at least one of the other information processors a batch processing notification inviting said at least one of the other processors to transmit to the management apparatus a performance request to perform a job;

wherein, when said at least one of the other processors receives the batch processing notification, the associated displaying means displays information that said at least one of the other processors is invited to transmit to the management apparatus a performance request to perform a job, wherein the management apparatus further includes a batch processing storing means;

wherein, if the batch processing notifying means transmits to at least one of the other processors the batch process notification, the batch processing storing means stores the job for which the notification was transmitted to said at least one of the other processors and said at least one of the other processors in relation to the job; and wherein, if the receiving means of the management apparatus receives from one of the information processors a performance request to perform a job, the batch processing notifying means of the management apparatus transmits, to the information processor or processors associated with a job stored in the batch processing storing means and related to the job for which the receiving means has received the performance request, a batch processing notification inviting the associated processor or processors to transmit to the management apparatus a performance request to perform a job.

* * * * *